(12) United States Patent
Donderici et al.

(10) Patent No.: US 11,561,319 B2
(45) Date of Patent: Jan. 24, 2023

(54) SOFTWARE TUNING OF BOREHOLE IMAGERS

(71) Applicant: Halliburton Energy Services, Inc., Houston, TX (US)

(72) Inventors: Burkay Donderici, Pittsford, NY (US); Baris Guner, Houston, TX (US); David Ronald Beard, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 499 days.

(21) Appl. No.: 16/336,862

(22) PCT Filed: Oct. 31, 2017

(86) PCT No.: PCT/US2017/059236
§ 371 (c)(1),
(2) Date: Mar. 26, 2019

(87) PCT Pub. No.: WO2019/088996
PCT Pub. Date: May 9, 2019

(65) Prior Publication Data
US 2021/0124081 A1 Apr. 29, 2021

(51) Int. Cl.
*G01V 3/38* (2006.01)
*E21B 49/00* (2006.01)
(Continued)

(52) U.S. Cl.
CPC ............ *G01V 3/38* (2013.01); *E21B 47/0025* (2020.05); *E21B 49/00* (2013.01); *G01V 3/02* (2013.01)

(58) Field of Classification Search
CPC combination set(s) only.
See application file for complete search history.

(56) References Cited

U.S. PATENT DOCUMENTS 3,060,373 A  10/1962  Doll
3,132,298 A   5/1964  Doll et al.
(Continued)

FOREIGN PATENT DOCUMENTS

| CA | 685727 | 5/1964 |
| WO | 2010045640 | 4/2010 |
| WO | 2019177588 | 9/2019 |

OTHER PUBLICATIONS

ISRWO International Search Report and Written Opinion for PCT/US2017/059236 dated Jul. 31, 2018.
(Continued)

*Primary Examiner* — Mohamed Charioui
(74) *Attorney, Agent, or Firm* — John Wustenberg; C. Tumey Law Group PLLC

(57) ABSTRACT

A method and a system for tuning a pad. The method may comprise disposing a downhole tool into a borehole, configuring the pad in a first configuration, taking a first measurement of the formation in the first configuration, configuring the pad in a second configuration, taking a second measurement of the formation in the second configuration, determining a tuning coefficient to reduce a tool body effect in the first measurement and the second measurement, computing a first weighted measurement from the tuning coefficient and the first measurement, computing a second weighted measurement from the tuning coefficient and the second measurement, and computing a tuned impedance from a ratio of the first weighted measurement and the second weighted measurement. A system for determining a formation boundary may comprise a downhole tool, an arm, and a pad. The system may further comprise a conveyance and an information handling system.

20 Claims, 9 Drawing Sheets

(51) Int. Cl.
*G01V 3/02* (2006.01)
*E21B 47/002* (2012.01)

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,675,610 | A * | 6/1987 | Chapman .............. G01V 3/20 324/366 |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 6,191,588 | B1 | 2/2001 | Chen |
| RE42,493 | E | 6/2011 | Tabarovsky et al. |
| 8,579,037 | B2 | 11/2013 | Jacob |
| 8,633,702 | B2 | 1/2014 | Bloemenkamp et al. |
| 2003/0164706 | A1 | 9/2003 | Iwanicki et al. |
| 2007/0046291 | A1 * | 3/2007 | Itskovich .............. G01V 3/24 324/367 |
| 2007/0103161 | A1 * | 5/2007 | San Martin .............. G01V 3/24 324/366 |
| 2009/0302854 | A1 * | 12/2009 | Forgang .............. G01V 3/24 324/355 |
| 2011/0140702 | A1 * | 6/2011 | Bloemenkamp ........ E21B 49/00 324/355 |
| 2011/0204897 | A1 * | 8/2011 | Hu .............. G01V 3/24 324/351 |
| 2013/0069656 | A1 * | 3/2013 | Haramboure ............ G01V 3/24 324/355 |
| 2014/0197839 | A1 | 7/2014 | Bloemenkamp |
| 2015/0177406 | A1 | 6/2015 | Li et al. |
| 2017/0248728 | A1 * | 8/2017 | Fouda .............. E21B 49/087 |

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.

* cited by examiner

SOFTWARE TUNING OF BOREHOLE IMAGERS

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

A downhole tool, such as a borehole imager may be beneficial in obtaining a detailed characterization of reservoirs. A borehole imager may provide a resistivity image of the formation immediately surrounding the borehole. A borehole imager may be used to determine formation stratigraphy, dips of the formation layers as well as borehole and formation stress. A borehole imager may allow for determining thin beds and fracture locations in oil based muds and/or water based muds.

Oil based muds may provide higher performance than the water based muds and especially preferable in deep water environments where high temperature and pressure cause loss of water and in shale zones where water may cause swelling. However, oil based mud is highly resistive. At low frequencies, this resistance reduces the sensitivity of the borehole imager to an outside formation. To overcome this effect, a borehole imager in oil based mud may operate at high frequencies. At these frequencies, the borehole imager through a pad disposed on the borehole imager becomes capacitively coupled to the formation, reducing the effect of the mud.

The body and/or mandrel of the borehole imager may have a "tool body effect" on measurements taken by the borehole imager, reducing the image quality. The tool body effect from the measured response, which is the impedance seen by return electrodes, may vary linearly (or at least monotonically) with changing formation resistivity in the range of interest produce higher contrast images. The linear behavior may be achieved when a condition related to impedances or voltages is achieved. Such condition may be called the "tuned" condition, and the act of achieving such condition is called tuning the borehole imager.

BRIEF DESCRIPTION OF THE DRAWINGS

For a detailed description of the preferred embodiments of the invention, reference will now be made to the accompanying drawings in which.

DETAILED DESCRIPTION

As disclosed below, a method to "tune" the borehole imager is described. A software based method may perform the tuning after measurements in the post processing stage. As disclosed, at least two different measurements may be taken with at least two different hardware configurations. Results from the measurements may be combined after the measurements to reduce the "tool body effect" of the borehole imager. Methods disclosed below may increase image quality, which may make the interpretation of images easier. Methods may extend the operation range of the downhole tool into lower formation resistivities. A software tuning approach should not require dynamic adjustments to the impedance in the case of changes in the environmental conditions, which presents an implementation complexity for hardware tuning. Although the methods disclosed below may be developed for an oil based mud imager, it may be used in a water based mud imager as well.

Figure 1:
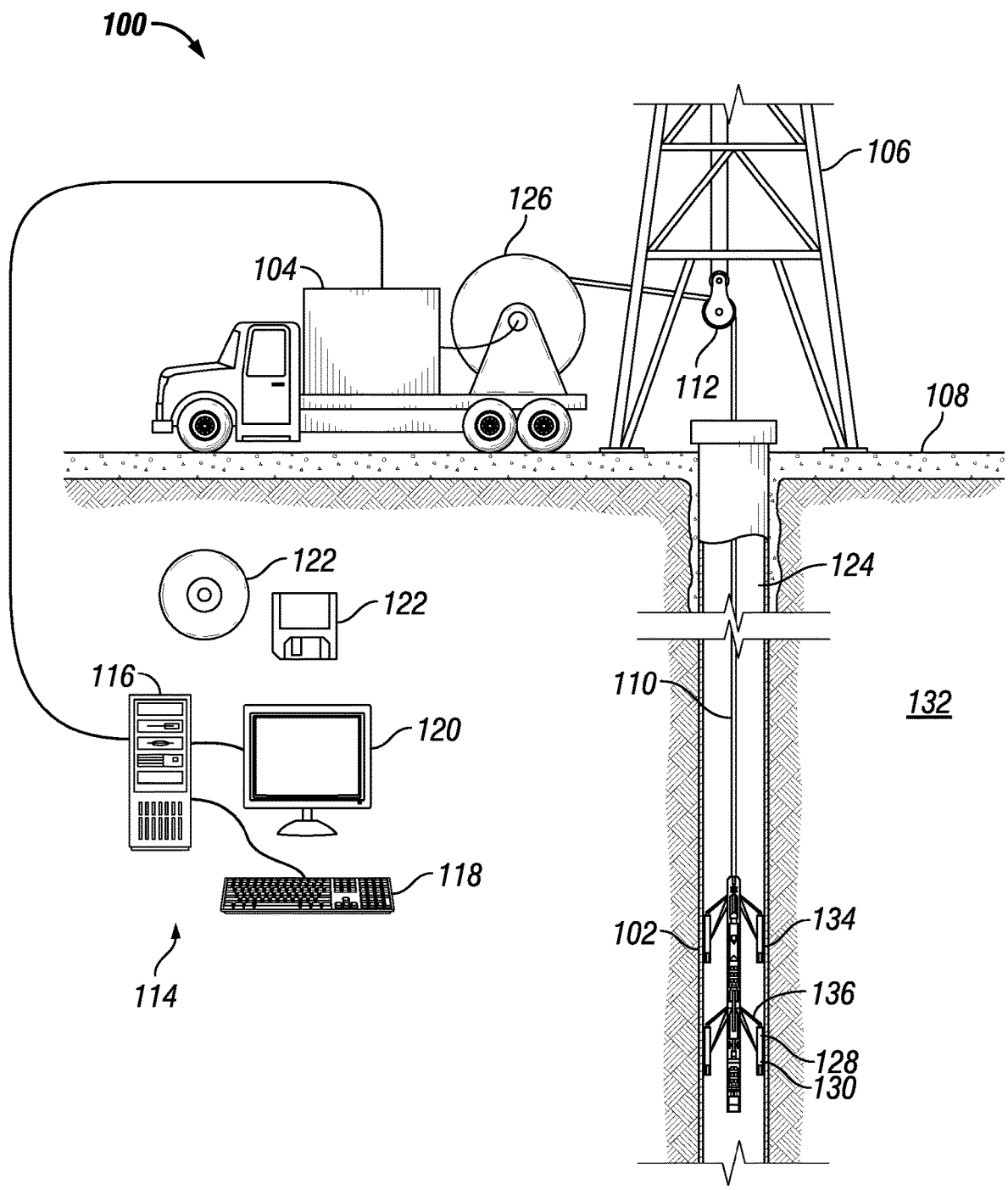
FIG. 1 illustrate an example of a well measurement system.

FIG. 1 illustrates a cross-sectional view of a well measurement system 100. As illustrated, well measurement system 100 may comprise downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some examples, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may be utilized by information handling system 114 to determine and display a high resolution resistivity image of the formation immediately surrounding the borehole. These images may be used in reservoir characterization. High resolution of the images allow identifying thin beds and other fine features such as fractures, clasts, and vugs. These images give information about the sedimentology, lithology, porosity and permeability of the formation. Thus, they complement, or in some cases replace, coring.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a button array 128 and/or a return electrode 130. Button array 128 and/or return electrode 130 may be disposed on at least one pad 134 in any suitable order. For example, a pad 134 may include only button arrays 128 and/or return electrodes 130. Further, a pad 134 may comprise both button array 128 and return electrodes 130. Pads 134 may be attached to at least one arm 136 that may extend from downhole tool 102. Arm 136 may extend pad 134 away from downhole tool 102. In examples, arm 136 may place pad 134 in contact with borehole 124. It should be noted that there may be a plurality of arms 136. One or more arms 136 may place an arrangement of button arrays 128 and/or return electrode 130 in close proximity to the wall of borehole 124.

In examples, downhole tool 102 may operate with additional equipment (not illustrated) on surface 108 and/or disposed in a separate well measurement system (not illustrated) to record measurements and/or values from formation 132. During operations, a voltage may be applied between button electrodes (discussed below) disposed on button array 128 and return electrode(s) 130. Level of the voltage may be controlled by an information handling system 114. This may cause currents to be transmitted through button array 128. These currents travel through the mud and formation 132 and eventually reach back to return electrode 130. Amount of current emitted by each button electrode is inversely proportional to the impedance seen by that button electrode. This impedance is significantly affected by the properties of formation 132 and mud directly in front of each button electrode. Thus, current emitted by each button electrode may be measured and recorded in order to obtain an image of the formation resistivity as well as other information such as pad standoff.

In other examples, a current may be transmitted from a transmitting electrode (not illustrated) and return to a return electrode 130. In this example, the transmitting electrode and return electrode 130 may be referred to as current electrodes. The voltage drop across a set of current electrodes may be measured and used to estimate the impedance of a formation 132. These set of current electrodes may constitute a button array 128. In examples, button arrays 128 may be referred to as voltage electrodes or monitor electrodes. Proposed method may operate in any of the two designs above or any other similar oil based mud resistivity borehole imager tool without any limitations. The recorded signal may be transferred to information handling system 114 for further processing. In examples, there may be any suitable number of button arrays 128 and/or return electrodes 130, which may be controlled by information handling system 114. Information and/or measurements may be processed further by information handling system 114 to determine properties of borehole 124, fluids, and/or formation 132.

Figure 2:
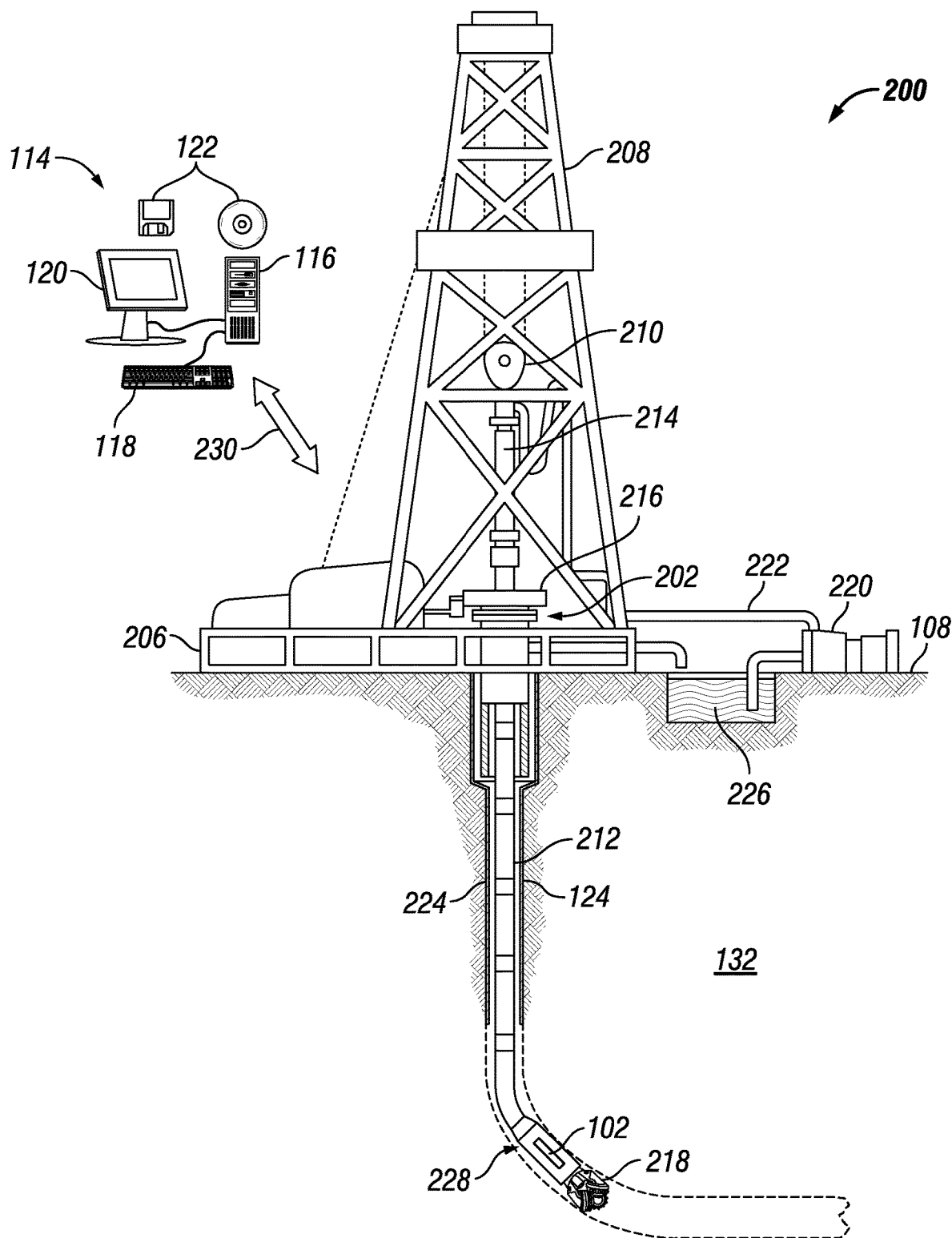
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into formation 132 from surface 108 (Referring to FIG. 1). Generally, borehole 124 may include horizontal, vertical, slanted, curved, and other types of borehole geometries and orientations. Imaging tools are primarily used in uncased sections of the borehole; however, measurements in cased sections may be made for purposes such as the calibration of the tool.

As illustrated, borehole 124 may extend through formation 132. As illustrated in FIG. 2, borehole 124 may extend generally vertically into the formation 132, however borehole 124 may extend at an angle through formation 132, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further comprise downhole tool 102 (Referring to FIG. 1). Downhole tool 102 may be disposed on the outside and/or within bottom hole assembly 228. Downhole tool 102 may comprise test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114 (Referring to FIG. 1), which may be disposed on surface 108. Without limitation, information handling system 114 may be disposed downhole in bottom hole assembly 228. Processing of information recorded may occur downhole and/or on surface 108. Processing occurring downhole may be transmitted to surface 108 to be recorded, observed, and/or further analyzed. Additionally, information recorded on information handling system 114 that may be disposed downhole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 3:
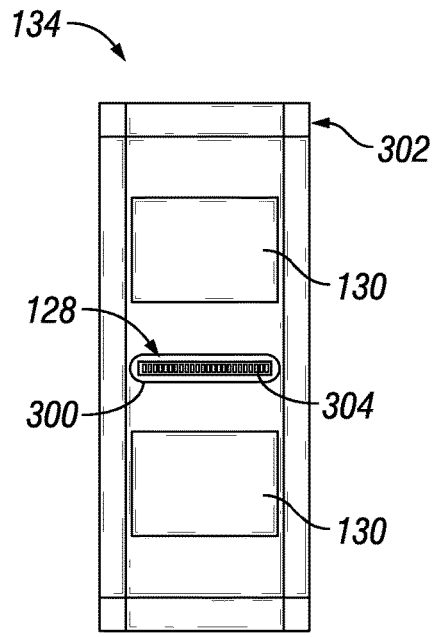
FIG. 3 illustrates an example of a pad.

FIG. 3 illustrates an example of pad 134. Pad 134 may serve to place button array 128 and/or return electrode 130 in contact with or in close proximity to borehole 124. Pad 134 may comprise a button array 128, a return electrode 130, a guard 300, and a housing 302. In examples, there may be a plurality of button arrays 128. There may be any suitable number of button electrodes 304 within button array 128 that may produce a desired, predetermined current. Without limitation, the range for a suitable number of button electrodes 304 within button array 128 may be from about one button electrode 304 to about one hundred button electrodes 304. For example, the range for a suitable number of button electrodes 304 within button array 128 may be from about one button electrode 304 to about twenty-five button electrodes 304, from about twenty-five button electrodes 304 to about fifty button electrodes 304, from about fifty button electrodes 304 to about seventy-five button electrodes 304, or from about seventy-five button electrodes 304 to about one hundred button electrodes 304.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. In examples, a voltage difference between button array 128 and return electrodes 130 may be applied, which may cause currents to be emitted from button array 128 into the mud (not illustrated) and formation 132 (referring to FIG. 1).

Guard 300 may help to focus most of the current produced by button array 128 into formation 132 radially. Guard 300 may be disposed around button array 128. Guard 300 may include the same potential as button array 128. Additionally, a housing 302 may serve to protect button array 128 and return electrodes 130 from the surrounding mud and formation 132. Housing 302 may be made with any suitable material. Without limitation, suitable material may be metals, nonmetals, plastics, ceramics, composites and/or combinations thereof. In examples, housing 302 may be a metal plate. Housing 302 may be connected through arm 136 to downhole tool 102 (referring to FIG. 1). An insulating material may be used to fill the remaining portions of pad 134. In examples, ceramics may be used as the insulating material to fill the remaining portions of pad 134. Insulation material may prevent and/or hinder the flow of current from downhole tool 102 to housing 302.

During operation of downhole tool 102, when a voltage is applied between return electrode 130 and button array 128, it is assumed that most currents transmitted through button electrodes 304 travel through mud (not illustrated) and formation 132 and return back to the return electrode 130 to complete the circuit. However, current may travel from formation 132 through housing 302 and/or a mandrel of downhole tool 102 to return electrode 130. This may be defined as the "tool body effect." Although these currents may return to return electrode 130, the resulting measured response may be askew due to the tool body effect. In particular, for high frequencies and low formation resistivities, the tool body effect causes measurement representing the relationship between formation resistivity and measured impedance to deviate from an ideal case. An ideal case may be defined as a measurement in which current does not flow form formation 132 through housing 302 and/or the mandrel to return electrode 130. Note that in the ideal case, there may be a linear relationship between the measured impedance and formation resistivity if mud effect is ignored. The mud effect may be removed using different methods, not described, which may be highly desirable to improve the quality of the obtained image.

Currently, attempts to remove the tool body effect and thus tune downhole tool 102 may involve adding an additional circuit component such as a capacitor or a variable resistor, whose impedance is either constant in value or actively maintained, between either housing 302 and return electrode 130 or housing 302 and button array 128. These impedances may be selected to balance downhole tool 102 (Referring to FIG. 3) such that the tool body effect may be reduced.

Figure 4A:
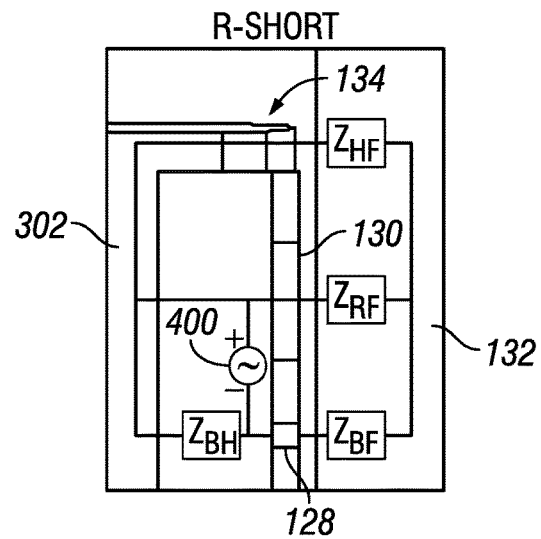
FIGS. 4a-4c illustrate examples of circuit models of a downhole tool.
Figure 4B:
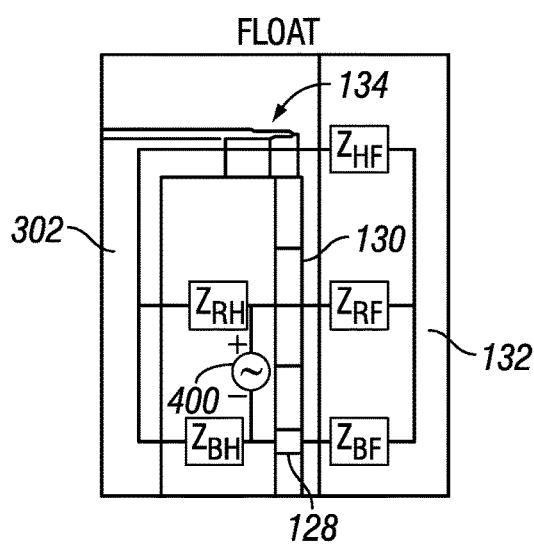
Figure 4C:
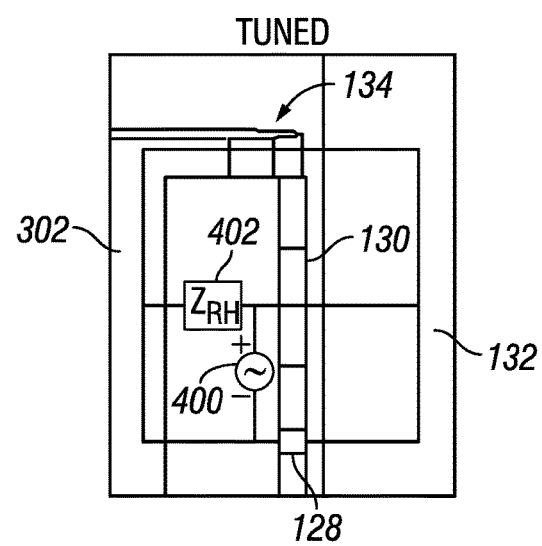

FIGS. 4a-4c illustrates examples of current circuit models for three different configurations of pad 134, which may describe, the operation of hardware tuning. Operation of pad 134 may be described in terms of impedance quantities. For example, impedance between button array 128 and formation 132 ($Z_{BF}$), impedance between return electrode 130 and formation 132 ($Z_{RF}$), impedance between housing 302 and formation 132 ($Z_{HF}$), and impedance between button array 128 and housing 302 ($Z_{BH}$). It should be noted, as illustrated in FIG. 4b, an additional impedance quantity, $Z_{RH}$, may be measured and utilized in hardware tuning. The impedance quantity, $Z_{RH}$, may be described as the impedance between return electrode 130 and housing 302. In examples, voltage source 400 may be applied between button array 128 and return electrode 130. FIG. 4a illustrates a case where the hardware of pad 134 may be configured such that return electrode 130 is at the same potential with housing 302. This may be called an "R-short" case. Although this hardware configuration may be easy to implement in hardware, it may cause degradation in the performance of downhole tool 102. In particular, for low resistivity formations at high resistivities as mentioned before, it may be observed that the "R-short" case may cause the impedance reading to be higher than what may be expected from a linear relationship. For example, an impedance versus resistivity curve displayed on a graph may bend upwards.

FIG. 4b illustrates a pad 134 with a "floating" hardware configuration. In this case pad 134 may be electrically separated from downhole tool 102 (Referring to FIG. 1). This configuration may provide increased linearity (ignoring the mud effects) compared to the R-short case depending on the actual values of the $Z_{BH}$ and $Z_{RH}$ but may still exhibit nonlinearity. This nonlinearity may show up as a curving upwards or curving downwards of the impedance-resistivity curve, again depending on the actual value of the impedances. Also, this case may be more difficult to implement than the R-short case.

In FIG. 4c, basic principles behind current hardware tuning is shown. In this case, additional circuit component or components may be added between housing 302 and button array 128 and/or housing 302 and button array 128 such that an ideal performance may be achieved. In the illustration of FIG. 4c, it is assumed that tuning was achieved by changing the impedance of the $Z_{RH}$ value with a circuit element 402. In examples, circuit element 402 may vary impedance through a potentiometer, a resistor bank, rheostat, thermistor, magneto resistor, photo resistor, humistor, force sensitive resistor, and/or the like. By changing the impedance of $Z_{RH}$, which may be controlled by information handling system 114 (Referring to FIG. 1), an ideal performance of the circuit may be achieved.

Figure 5A:
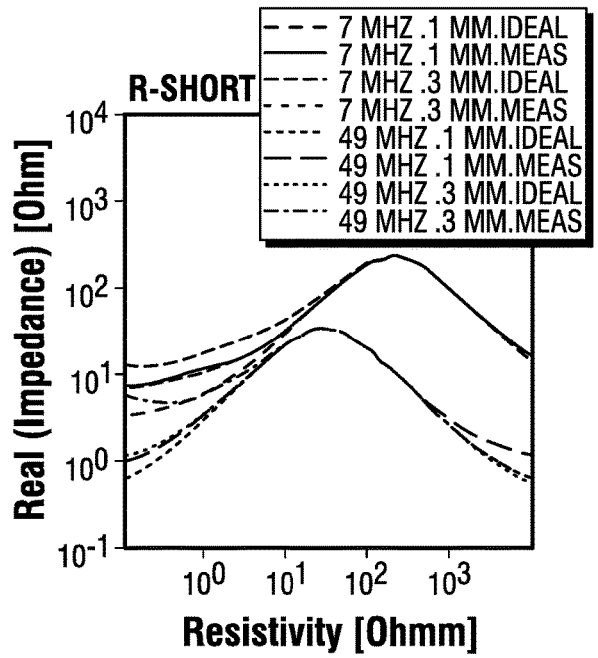
FIGS. 5a-5c illustrate graphs of impedance vs resistivity for circuit models of FIGS. 4a-4c.
Figure 5B:
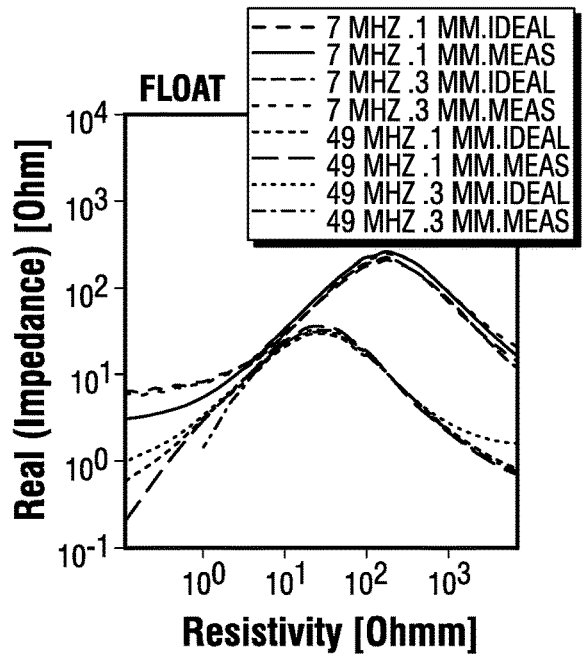
Figure 5C:
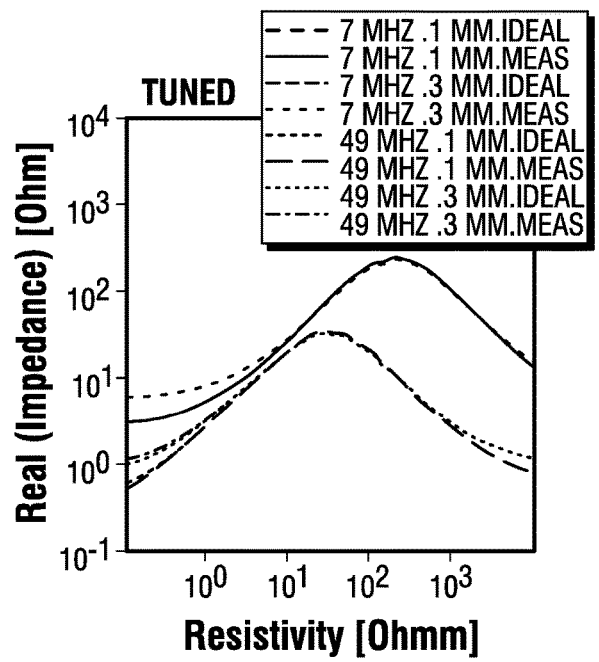

FIGS. 5a-5c are graphs that illustrate measured impedance versus formation resistivity (Rt) plots for these the three configurations illustrated in FIGS. 4a-4c, respectively. Measured results may be compared with ideal results at 7 and 49 MHz and for 1 mm and 3 mm standoff, where ideal results are without any tool body effect. Measured results may be calculated as a ratio of the voltage between button array 128 and return electrode 130 to that of the current from button array 128. An ideal result may be found in a simulation by calculating the total impedance ($Z_{BF}+Z_{RF}$), which may be performed in software but not possible in practice. As illustrated in FIG. 5(a), the curves follow a bell-shape, where stand-off and tool body effects cause deviation from a linear profile at the low resistivity end (left-side of figures), and formation 132 dielectric effect creates a deviation at the high resistivity end (right-side of the figures). The linear optimum operation range of downhole tool 102 is where there is a linear relationship between resistivity and real part of impedance, for example 1 to 10 Ohmm for 49 MHz, and 1 to 100 Ohmm for 7 MHz). As illustrated in FIGS. 5a-5c, a pronounced tool body effect due to a high stand-off may be observed. This effect exhibits itself as a curving up in R-short configuration (Figures (a)), and curving down in Float configuration (FIG. 5 (b)). Tuning of downhole tool 102 allows the elimination of the tool body effect and obtain a response very similar to an ideal case where tool body effect may not be present, as illustrated in Figure 5c. These focused results may be obtained by making formation voltage equal to that of housing 302 (Referring to FIGS. 4a-4c) such the current on housing 302 may be about zero, which may be an ideal measurement.

Figure 6:
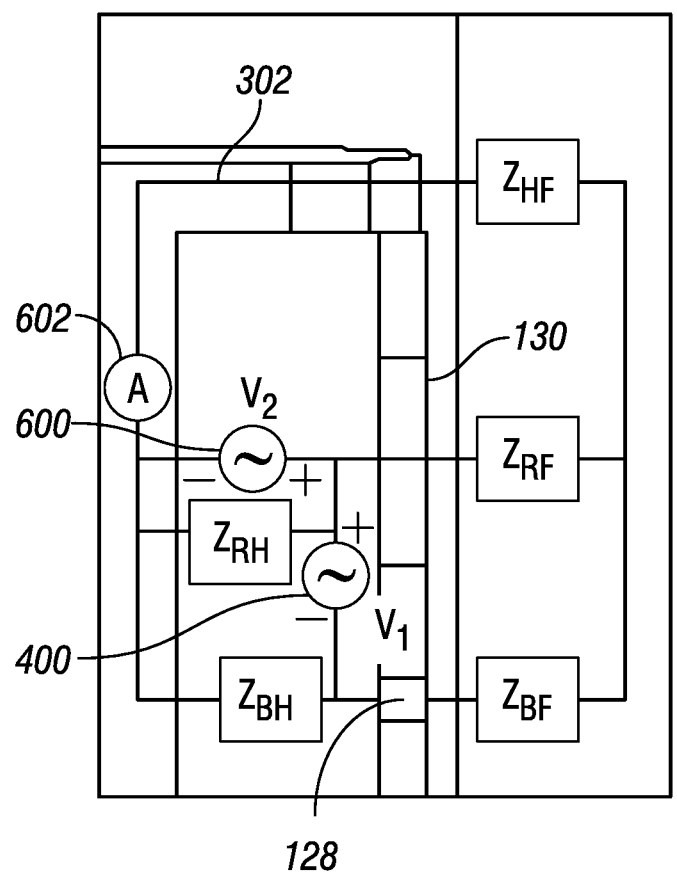
FIG. 6 illustrates another example of a circuit model for tuning the pad.

FIG. 6 illustrates an example of software implementation to perform tuning. In examples, a second voltage source 600 may be added between return electrode 130 and housing 302 as well as an ammeter 602 on housing 302. Second voltage source 600 and ammeter 602 may be utilized to tune measured responses recorded by return electrode 130. This configuration, unlike the configuration illustrated in FIG. 4c, may allow for two measurements to be made to tune impedance across housing 302. Exciting first voltage source 400 may short second voltage 600, which may allow for a current reading to be taken at ammeter 602 in a first configuration. Second voltage course 600 may be excited, which may short first source 400 and may allow for a current reading to be taken at ammeter 602 in a second configuration. The measurements may be utilized to tune the impedance within housing 302.

Figure 7:
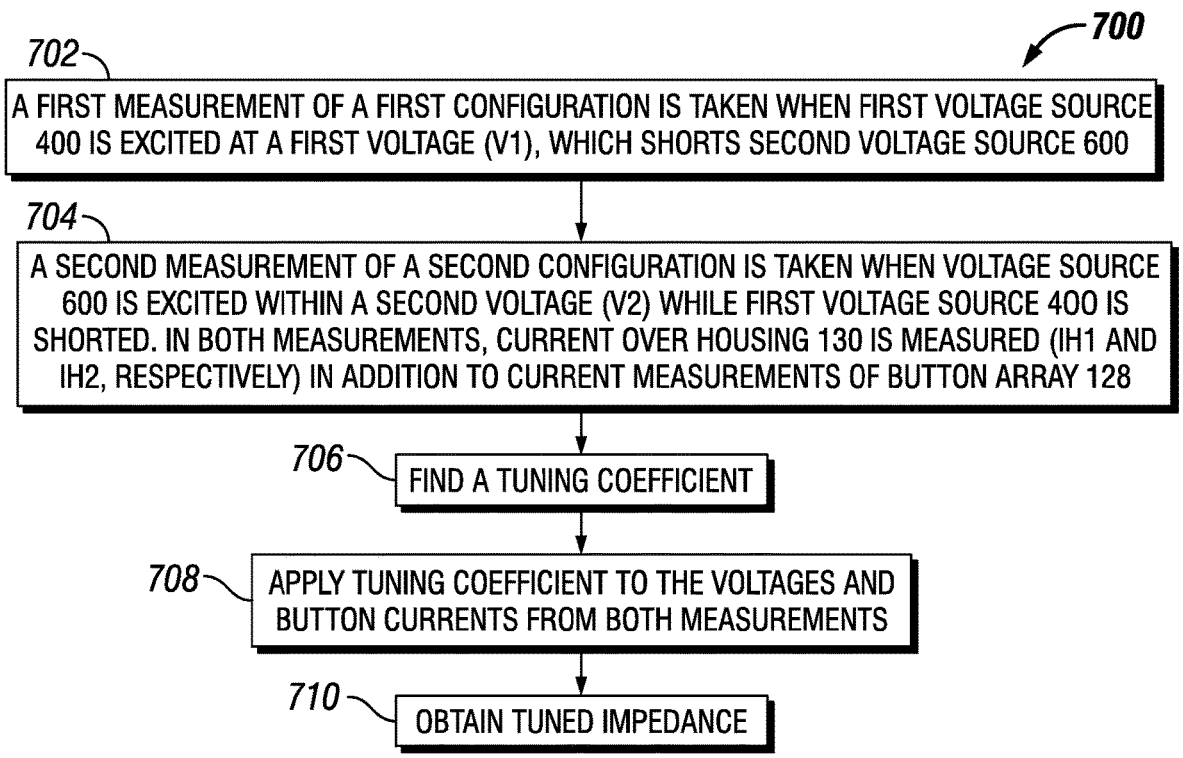
FIG. 7 illustrates a flow chart for obtaining tuned impedance.

A flow chart 700, FIG. 7, illustrates a method for finding and obtaining a tuned impedance. Two different measurements may be made. In block 702, a first measurement of a first configuration is taken when first voltage source 400 is excited at a first voltage ($V_1$), which shorts second voltage source 600. In block 704, a second measurement of a second configuration is taken when second voltage source 600 is excited with a second voltage ($V_2$) while first voltage source 400 is shorted. In both measurements, current over housing 302 is measured ($I_{H1}$ and $I_{H2}$, respectively) in addition to current measurements of button array 128. It should be noted that the first measurement may be performed when down-logging and the second measurement may be performed when up-logging, or vice-versa. Additionally, the configuration may be changed between the first measurement and the second measurement. A tuning coefficient K may be found in block 706 such that the sum of current from housing 302 with the first measurement multiplied with the current from the second measurement is equal to zero. As disclosed below:

$$V=(V_1,0) \quad (1)$$

which represents, $$I_H=I_{H1} \quad (2)$$

where, $$V=(0,V_2) \quad (3)$$

which represents, $$I_H=I_{H2} \quad (4)$$

where, $$V=(V_1,KV_2) \quad (5)$$

and, $$I_H=I_{H1}+KI_{H2} \quad (6)$$

and, $$I_{H1}+KI_{H2}=0 \quad (7)$$

and, $$I_H=0 \quad (8)$$

and, $$K=-(I_{H1}/I_{H2}) \quad (9)$$

Tuning coefficient K may then be applied in step 708 to currents from button array 128 (Referring to FIG. 6), currents from the two measurements, and voltage measurements $V_1$ and $V_2$ between return electrode 130 and button array 128. Then, the tuned impedance is obtained in step 710 with a ratio of the weighted voltage between button array 128 to return electrode 130 to that of the weighted current of button array 128. The tuned impedance may then be displayed to an operator in a graph of impedance versus formation resistivity results.

In examples, a voltage measurement or current measurement may be performed as an indicator of the tool body effect during the first measurement and/or the second measurement. They may be labeled as the first indicator or the second indicator, respectively. In examples, the weighed measurement may be based on the first measurement and/or the second measurement. Additionally, an average of multiple indicators at multiple logging depths may be used for weighted calculation. For example, a current measurement may be identified as an indicator and the weight applied to the measurement may be chosen such that the current associated with the third set of corrected measurement may be equal to zero. Additionally, a voltage measurement may be identified as an indicator and the weight applied to the measurement may be chosen such that the current associated with the third set of corrected measurement may be equal to zero. Weight may also be calculated as a linear sum of the first indicator and the second indicator.

Figure 8A:
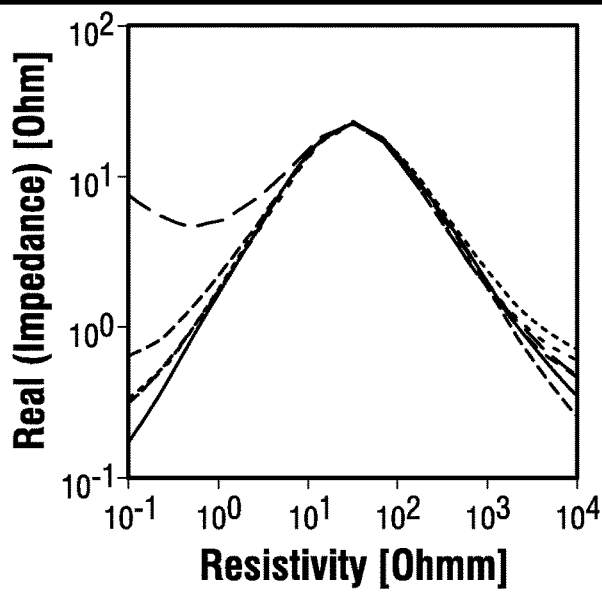
FIGS. 8a and 8b illustrate graphs of impedance vs resistivity for the circuit model of FIG. 6.
Figure 8B:
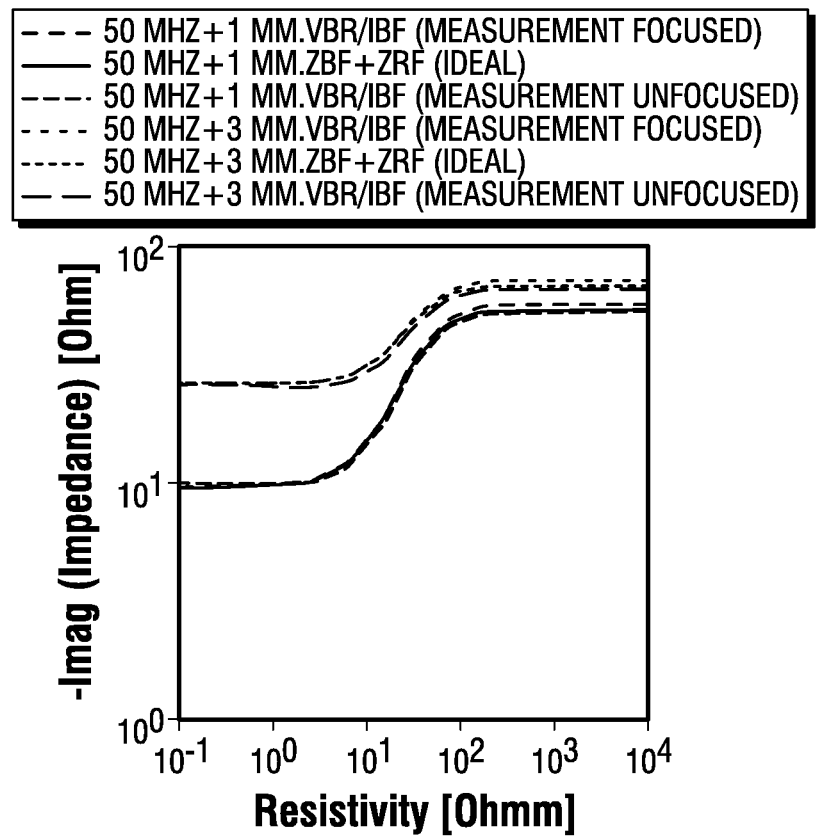

FIGS. 8a and 8b are graphs that show the impedance versus formation resistivity results for software tuning. This case is simulated for a 6" (15.3 cm) borehole with a 1600 Ω-m mud with ε of 4 and a formation ε of 10. Both the real and imaginary parts of the measured impedance are shown. As illustrated, unfocused results correspond to the R-short (FIG. 4a). It is illustrated that after tuning (i.e. focusing), results may be close to an ideal response where a tool body effect may not be found.

Figure 9:
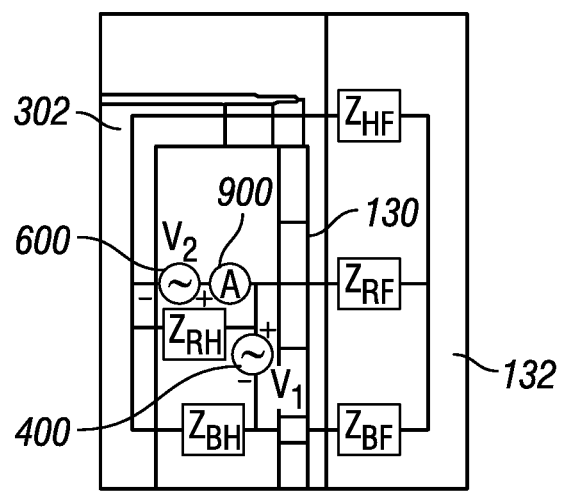
FIG. 9 illustrates another example of a circuit model for tuning the pad.
Figure 10:
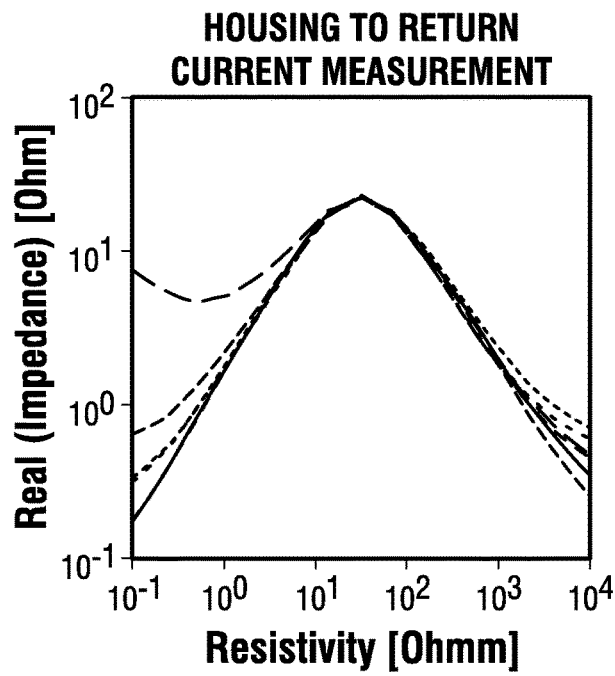
FIG. 10 illustrates a graph of impedance vs resistivity for the circuit model of FIG. 9.

Although the implementation described above may be an effective way to eliminate tool body effect, it may be difficult to measure current passing through housing 302 (Referring to FIGS. 4a-4c). As discussed below, current measurement or voltage measurements may be performed in the first measurement or second measurement to determine the tuning coefficient. In examples, a configuration shown in FIG. 9 may be used. In this configuration, an ammeter 900 may be connected in between housing 302 and return electrode 130 in addition to second voltage source 600 and first voltage source 400. In this configuration eliminating the current flowing from housing 302 to return electrode 130 may be easier to measure. The flow chart 700 for finding and obtaining a tuned impedance in FIG. 7 may be utilized with the configuration in FIG. 9. FIG. 10 illustrate impedance vs resistivity for this software approach, which is nearly identical to the measured approach illustrated in FIGS. 8a and 8b.

Figure 11:
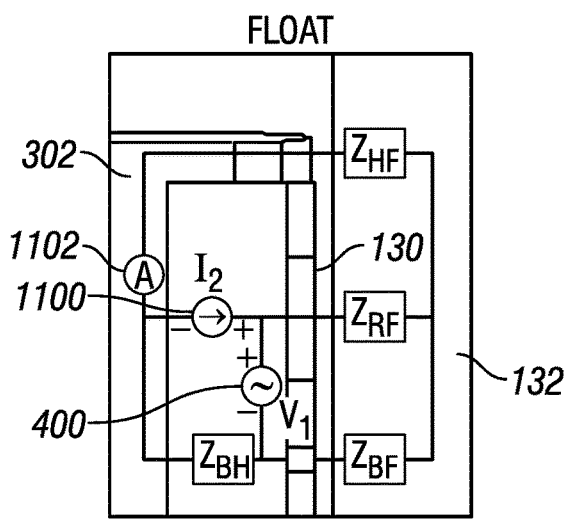
FIG. 11 illustrates another example of a circuit model for tuning the pad.

It should be noted that there may be different circuit configurations for R-short circuits and floating circuits. For example, the R-short circuit may be found in different circuit configurations. For example, referring to FIG. 6, the hardware configuration used to implement software focusing may be equivalent to a R-short configuration when second voltage source 600 was turned off. Where the R-short configuration in FIG. 4a may not comprise second voltage source 600. Additionally, a floating circuit, as illustrated in FIG. 4b may be configured in a circuit differently. For example, in FIG. 11 a configuration which may be as floating circuit is shown. In this configuration, in addition to ammeter 1102 and first voltage source 400, a current source 1100 may be added between housing 302 and return electrode 130 instead of a second voltage source 600 (as illustrated in FIG.

9) which is an open circuit when it is not operating, thus giving a floating configuration.

Figure 12:
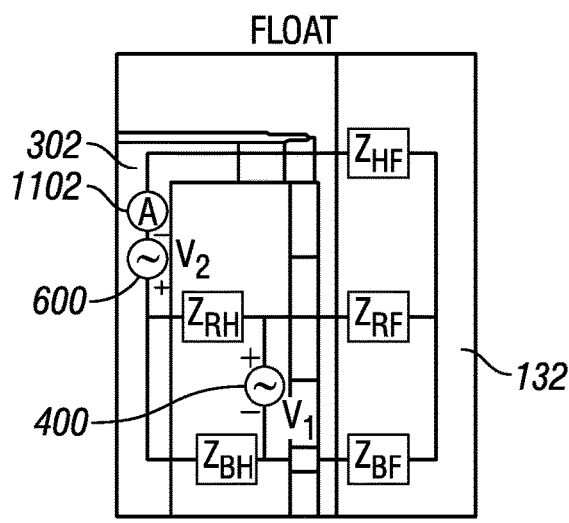
FIG. 12 illustrates another example of a circuit model for tuning the pad.

Similarly, configuration seen in FIG. 12 may also be used to obtain a floating configuration. In this configuration, in addition to ammeter 1102 and first voltage source 400, second voltage source 600 may be connected to housing 302, which, when not operating, reduces to a floating configuration. It should be noted that this is an example in practice voltage source (not illustrated) may have a component parallel to $Z_{HF}$ as well.

In some implementations of the software tuning, it may be required to separate the grounds of measurement tool (i.e. ammeter) and a voltage source in order to obtain two distinct modes of downhole tool 102. For example, a switch may be placed in between housing 132, return electrode 130, or guard 300. When the switch is on, return-short (or button-short) configuration may be obtained while when it is off a floating configuration may be obtained.

Figure 13A:
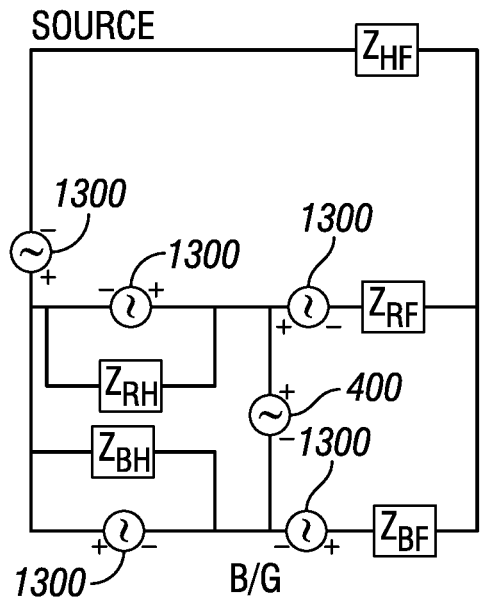
FIGS. 13a-13c illustrate examples of circuit models for tuning the pad with gates.
Figure 13B:
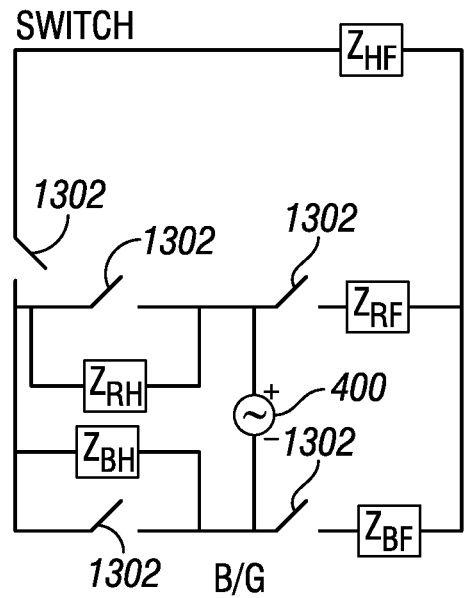
Figure 13C:
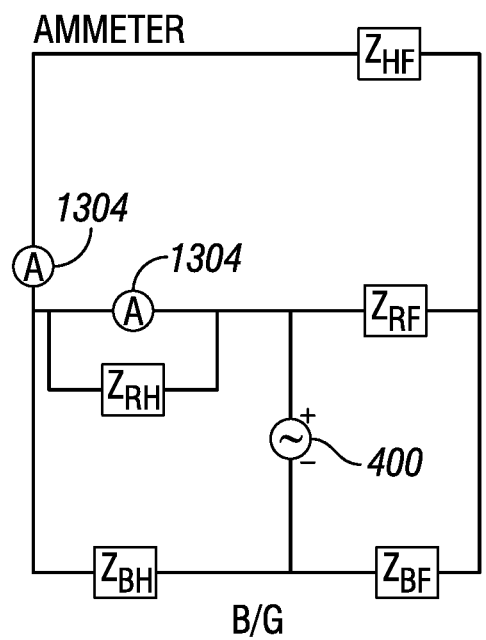

FIGS. 13a through 13c illustrate examples of disposing voltage sources 1300, switches 1302, and ammeters 1304, in relation to first voltage source 400, to obtain distinct hardware modes to perform focusing. FIGS. 13a through 13c illustrate possible current flow from button electrodes 304 disposed on pad 134, through formation 132, housing 302, return electrodes 130, and corresponding impedance measurements for tuning. However, it should be noted that random hardware configuration may not always be tunable. Two modes that is amenable to tuning based on the specific configuration of pad 134 (Referring to FIG. 1) may be selected to achieve tuning in which the two modes exhibit opposing behaviors with the tool body effect.

In examples, a log may be run in borehole 124 (Referring to FIG. 1) using a certain configuration (such as Return-short) and a second log maybe run using a different configuration (such as Button-short) in the same borehole 124 and the results may be combined using the methods described above. This implementation may prevent continuous switching between different modes but may require advanced depth and feature matching to obtain accurate results.

In examples, a downhole tool 102 may have a first pad and a second pad (e.g., pads 134 in FIG. 1) with two different hardware configurations. The first pad and the second pad may have the same azimuthal angle with respect to the axis of downhole tool 102 and may be separated by a small axial distance (such as a couple of feet.) The first pad and the second pad may then log independently and at the end results may be combined using the methods described above. Depth matching in this method may be easier but may require two sets of pads to do the same measurement.

This method and system may include any of the various features of the compositions, methods, and systems disclosed herein, including one or more of the following statements.

Statement 1: A method for tuning a pad may comprise disposing a downhole tool into a borehole that penetrates a formation, wherein the downhole tool comprises the pad and wherein the pad is connected to the downhole tool through an arm; configuring the pad in a first configuration; taking a first measurement of the formation in the first configuration; configuring the pad in a second configuration; taking a second measurement of the formation in the second configuration; determining a tuning coefficient to reduce a tool body effect in the first measurement and the second measurement; computing a first weighted measurement from the tuning coefficient and the first measurement; computing a second weighted measurement from the tuning coefficient and the second measurement; and computing a tuned impedance from a ratio of the first weighted measurement and the second weighted measurement.

Statement 2: The method of statement 1, further comprising determining a plurality of tuning coefficients, producing a graph of at least one of the plurality of tuning coefficients in relation to a formation resistivity measurement, and selecting the tuning coefficient among the plurality of tuning coefficients.

Statement 3: The method of statement 1 or statement 2, further comprising adjusting the tuning coefficient while the downhole tool is disposed in the borehole.

Statement 4: The method of any previous statement, wherein the taking the first measurement is made down-logging and the taking the second measurement is made during up-logging.

Statement 5: The method of any previous statement, further comprising performing a voltage measurement or a current measurement as an indicator.

Statement 6: The method of any previous statement, further comprising averaging a plurality of indicators from a plurality of depths and calculating a weighted measurement for the averaging of the plurality of indicators.

Statement 7: The method of any previous statement, further comprising taking the current measurement as the indicator and a weighted measurement is applied to the current measurement such that the current measurement is about zero.

Statement 8: The method of any previous statement, further comprising taking the voltage measurement as the indicator and a weighted measurement is applied to the voltage measurement such that the voltage measurement is about zero.

Statement 9: The method of any previous statement, wherein the tuning coefficient is calculated using a linear sum of a first indicator and a second indicator.

Statement 10: The method of any previous statement, further comprising taking a second current to measure a current through the arm connecting the arm to the downhole tool.

Statement 11 The method of any previous statement, further comprising taking a second voltage to measure a voltage difference between a housing of the pad and the formation.

Statement 12: The method of any previous statement, wherein a switch is disposed in the downhole tool and in the first configuration the switch is on and the second configuration the switch is off.

Statement 13: The method of any previous statement, wherein a capacitor is disposed in the downhole tool and in the first configuration the capacitor is connected and the second configuration the capacitor is disconnected.

Statement 14: The method of any previous statement, wherein a variable resistor is disposed in the downhole tool and in the first configuration the variable resistor is set to a first value and the second configuration the variable resistor is set to a second value.

Statement 15: The method of any previous statement, wherein a current source disposed in the downhole tool and in the in the first configuration the current source is set to a first signal and in the second configuration the current source is set to a second signal.

Statement 16: The method of any previous statement, wherein a voltage source disposed in the downhole tool and in the in the first configuration the voltage source is set to a first signal and in the second configuration the voltage source is set to a second signal.

Statement 17: A system for determining a formation boundary may comprise a downhole tool, wherein the downhole tool may comprise an arm and a pad, wherein the pad comprises a button array and at least one return electrode. The system may further comprise a conveyance and an information handling system, wherein the information handling system is configured to construct the pad in a first configuration; take a first measurement of a formation in the first configuration; construct the pad in a second configuration; take a second measurement of the formation in the second configuration; determine a tuning coefficient to reduce a tool body effect in the first measurement and the second measurement; compute a first weighted measurement from the tuning coefficient and the first measurement; compute a second weighted measurement form the tuning coefficient and the second measurement; and compute a tuned impedance from a ratio of the first weighted measurement and the second weighted measurement.

Statement 18: The system of statement 17, wherein the conveyance is a wireline, wherein the downhole tool is disposed on the wireline.

Statement 19: The system of statement 17 or statement 18, wherein the conveyance is a drill string, wherein a bottom hole assembly is disposed on the drill string, wherein the downhole tool is disposed in the bottom hole assembly.

Statement 20: The system of any one of statements 17-19, wherein different configurations comprise a change in an operation mode of a voltage source, a current source, or an electrical switch.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for tuning a pad comprising:
    disposing a downhole tool into a borehole that penetrates a formation, wherein the downhole tool comprises the pad and wherein the pad is connected to the downhole tool through an arm;
    configuring the pad in a first configuration with a first impedance quantity;
    taking a first measurement of the formation in the first configuration;
    configuring the pad in a second configuration with a second impedance quantity, wherein the first impedance quantity and the second impedance quantity are different;
    taking a second measurement of the formation in the second configuration;
    determining a tuning coefficient to reduce a tool body effect in the first measurement and the second measurement;
    computing a first weighted measurement from the tuning coefficient and the first measurement;
    computing a second weighted measurement from the tuning coefficient and the second measurement; and
    computing a tuned impedance from a ratio of the first weighted measurement and the second weighted measurement.

2. The method of claim 1, further comprising determining a plurality of tuning coefficients, producing a graph of at least one of the plurality of tuning coefficients in relation to a formation resistivity measurement, and selecting the tuning coefficient among the plurality of tuning coefficients.

3. The method of claim 1, further comprising adjusting the tuning coefficient while the downhole tool is disposed in the borehole.

4. The method of claim 1, wherein the taking the first measurement is made down-logging and the taking the second measurement is made during up-logging.

5. The method of claim 1, further comprising performing a voltage measurement or a current measurement as an indicator.

6. The method of claim 5, further comprising averaging a plurality of indicators from a plurality of depths and calculating a weighted measurement for the averaging of the plurality of indicators.

7. The method of claim 5, further comprising taking the current measurement as the indicator and a weighted measurement is applied to the current measurement such that the current measurement is about zero.

8. The method of claim 5, further comprising taking the voltage measurement as the indicator and a weighted measurement is applied to the voltage measurement such that the voltage measurement is about zero.

9. The method of claim 5, wherein the tuning coefficient is calculated using a linear sum of a first indicator and a second indicator.

10. The method of claim 5, further comprising taking a second current to measure a current through the arm connecting the arm to the downhole tool.

11. The method of claim 5, further comprising taking a second voltage to measure a voltage difference between a housing of the pad and the formation.

12. The method of claim 1, wherein a switch is disposed in the downhole tool and in the first configuration the switch is on and the second configuration the switch is off.

13. The method of claim 12, wherein a capacitor is disposed in the downhole tool and in the first configuration the capacitor is connected and the second configuration the capacitor is disconnected.

14. The method of claim 1, wherein a variable resistor is disposed in the downhole tool and in the first configuration the variable resistor is set to a first value and the second configuration the variable resistor is set to a second value.

15. The method of claim 1, wherein a current source disposed in the downhole tool and in the in the first configuration the current source is set to a first signal and in the second configuration the current source is set to a second signal.

16. The method of claim 1, wherein a voltage source disposed in the downhole tool and in the first configuration the voltage source is set to a first signal and in the second configuration the voltage source is set to a second signal.

17. A system for determining a formation boundary, comprising:
  a downhole tool, wherein the downhole tool comprises:
    an arm; and
    a pad, wherein the pad comprises a button array and at least one return electrode;
  a conveyance; and
  an information handling system, wherein the information handling system configures the pad in a first configuration with a first impedance quantity;
  take a first measurement of a formation in the first configuration; configures the pad in a second configuration with a second impedance quantity, wherein the first impedance quantity and the second impedance quantity are different; take a second measurement of the formation in the second configuration; determine a tuning coefficient to reduce a tool body effect in the first measurement and the second measurement; compute a first weighted measurement from the tuning coefficient and the first measurement; compute a second weighted measurement form the tuning coefficient and the second measurement; and compute a tuned impedance from a ratio of the first weighted measurement and the second weighted measurement.

18. The system of claim 17, wherein the conveyance is a wireline, wherein the downhole tool is disposed on the wireline.

19. The system of claim 17, wherein the conveyance is a drill string, wherein a bottom hole assembly is disposed on the drill string, wherein the downhole tool is disposed in the bottom hole assembly.

20. The system of claim 17, wherein different configurations comprise a change in an operation mode of a voltage source, a current source, or an electrical switch.

* * * * *